United States Patent [19]
Mikami et al.

[11] Patent Number: 6,039,673
[45] Date of Patent: Mar. 21, 2000

[54] CONTROL SYSTEM FOR AUTOMATIC TRANSMISSION

[75] Inventors: Kazuhiro Mikami; Kazuhito Yamada; Jiro Nishiwaki, all of Anjo, Japan

[73] Assignee: Aisin AW Co., Ltd., Japan

[21] Appl. No.: 09/206,152

[22] Filed: Dec. 7, 1998

[30] Foreign Application Priority Data

Dec. 8, 1997 [JP] Japan .................................. 9-337462

[51] Int. Cl.⁷ .................................................. B60K 41/20
[52] U.S. Cl. ............................................................ 477/93
[58] Field of Search ................................ 477/93, 71, 75, 477/92, 114, 121, 143, 901; 701/59

[56] References Cited

U.S. PATENT DOCUMENTS

| | | | |
|---|---|---|---|
| 5,586,954 | 12/1996 | Iwata et al. | |
| 5,692,990 | 12/1997 | Tsukamoto et al. | 477/93 |
| 5,741,200 | 4/1998 | Taniguchi et al. | 477/114 X |
| 5,769,753 | 6/1998 | Kusafuka et al. | 477/116 |
| 5,772,553 | 6/1998 | Tsukamoto et al. | 477/95 |
| 5,800,308 | 9/1998 | Tsutsui | 477/116 |

FOREIGN PATENT DOCUMENTS

| | | |
|---|---|---|
| 942435 | 2/1997 | Japan . |
| 9112673 | 5/1997 | Japan . |
| 9177963 | 7/1997 | Japan . |

*Primary Examiner*—Dirk Wright
*Attorney, Agent, or Firm*—Lorusso & Loud

[57] ABSTRACT

A control system for an automatic transmission including a hydraulic power transmission, a clutch, and a brake which is engaged to prevent a vehicle from rolling backward thereby establishing a hill-hold state in the speed change unit. The control system includes a stop state detector which detects the vehicle stopped state when the forward driving range is selected, the accelerator pedal is released and the brake pedal is depressed. The control system further includes a clutch disengaging system which provides a neutral control, and a brake engaging system which provides a hill-hold control and performs a neutral control with the engine not under a load.

7 Claims, 11 Drawing Sheets

FIG. 3

| | | SOLENOID VALVE | | | CLUTCH | | | | BRAKE | | O.W.C. | |
|---|---|---|---|---|---|---|---|---|---|---|---|---|
| | | S1 | S2 | S3 | C0 | C1 | C2 | C3 | B1 | B2 | F0 | F1 |
| P | | ○ | × | × | × | × | × | ○ | × | × | × | × |
| R | V≦7 | ○ | × | × | × | × | ○ | ○ | × | ○ | × | × |
| R | V>7 | × | ○ | × | × | × | ○ | ○ | × | × | × | × |
| N | | ○ | × | × | × | × | × | ○ | × | × | × | × |
| D | 1ST | ○ | × | × | × | ○ | × | ○ | × | (○) | ○ | ○ |
| D | 2ND | ○ | ○ | × | × | ○ | × | ○ | ○ | × | ○ | × |
| D | N* | ○ | ○ | ○ | × | △ | × | ○ | △ | × | ○ | × |
| D | 3RD | × | ○ | × | ○ | ○ | × | ○ | ◎ | × | ○ | × |
| D | 4TH | × | × | × | ○ | ○ | × | × | ○ | × | × | × |
| REMARKS | ○ | | ON | | | ENGAGE | | | | | | LOCK | |
| REMARKS | × | | OFF | | | DISENGAGE | | | | | | FREE | |
| REMARKS | ◎ | | | | | DISENGAGE WITH RELEASE PRESSURE | | | | | | | |
| REMARKS | △ | | | | | ON·OFF AT NEUTRAL CONTROL | | | | | | | |
| REMARKS | (○) | | | | | ENGAGE AT ENGINE BRAKE | | | | | | | |

CONTROL SYSTEM FOR AUTOMATIC TRANSMISSION

BACKGROUND OF THE INVENTION

1. Field of the Invention

The invention relates to a control system for an automatic transmission.

2. Description of the Related Art

In a conventional automatic transmission, rotation from the engine is transmitted to a speed change unit through a hydraulic power transmission, and speed changes are effected in the speed change unit. A first clutch (an input clutch) is arranged between the hydraulic transmission and the speed change unit for change between a neutral range and a forward driving range by engaging/disengaging the first clutch.

In the automatic transmission, a neutral control is performed by disengaging the first clutch based on a hydraulic pressure modulated by a linear solenoid valve when the forward driving range is selected, an accelerator pedal is released, a brake pedal is depressed and the vehicle is in a "vehicle stopped state" defined as a vehicle speed of almost 0. Fuel consumption is improved by such neutral control because the load on the engine is reduced and vibration of the engine is prevented.

Within the neutral control, a hill-hold function is provided so that the vehicle will not move backward when the brake pedal is released for starting, after the vehicle has been stopped on an incline and facing up-hill. To provide the hill-hold function, when it is detected that the vehicle is in the "vehicle stopped state", a hill-hold output is output to establish a hill-hold state in the speed change unit by, for example, engaging a first brake and locking a designated one-way clutch.

However, in the conventional automatic transmission, when the first brake is engaged very shortly after the hill-hold output, the hill-hold state is established while engaging the first clutch. In this case, the automatic transmission is rotated to a small degree, in one direction around an input shaft, by a reaction force received before the hill-hold state is established and held. When the first brake is engaged before disengaging the first clutch in this state, the automatic transmission is held in a state wherein the automatic transmission receives the reaction force. The engine, connected to the automatic transmission, is thereby held in the same state. As a result, the neutral control is performed in a state wherein the engine is under a load. Therefore, the load on the engine increases accompanying the change in the conditions of the neutral control. As a result, the fuel consumption is not improved and vibration of the engine is not reduced to the extent that it cannot be felt in the driver's seat.

SUMMARY OF THE INVENTION

In view of the above problems associated with the prior art, an objective of the present invention is to provide a control system for an automatic transmission solving the problems of the conventional control system for an automatic transmission, and providing a neutral control without a load on the engine, with improvement in fuel consumption, and with prevention of transmission of engine vibration to the driver's seat.

To meet the foregoing objective, the present invention provides a control system for an automatic transmission including a hydraulic power transmission connected to the engine, a clutch which is engaged when a forward driving range is selected, a brake which is engaged to prevent the vehicle moving backward and to thereby establish a hill-hold state in the speed change unit, a stop state detector which detects a "vehicle stopping state" when the forward driving range is selected, an accelerator pedal is released and a brake pedal is depressed, a clutch disengaging system which performs a neutral control wherein the clutch is almost disengaged, and a brake engaging system which performs the hill-hold control by engaging the brake when the clutch is almost disengaged by the clutch disengaging system.

In a preferred embodiment, the control system of the present invention further comprises a delay system which delays the time of hill-hold output for starting the hill-hold control until a point in time after start of the neutral control. Preferably, the delay system times the hill-hold output for when a predetermined time has elapsed after the vehicle stopped state is detected. Alternatively, the delay system provides the hill-hold output based on a change in the state of the clutch.

In another preferred embodiment the control system of the present invention further includes an operation state detector which detects the operative state of the engine and a learning control system which performs a learning control for the timing of the hill-hold output based on an engine operative state for a non-driving range and an engine operative state for the hill-hold control.

Then the learning control system renews the hill-hold time by setting a first value at 0 and incrementally changing same with the learning.

According to the invention, when the vehicle stopped state is detected, by detecting that the forward driving range has been selected, the accelerator pedal has been released and the brake pedal is depressed, the neutral control is started, and then, the hill-hold control is started.

Therefore, when the brake is engaged in an very short time after the hill-hold output, the hill-hold state is not established while engaging the clutch. That is, when the speed change unit is in the hill-hold state, the engine is in the same state as when the neutral range is selected. Therefore, the neutral control is prevented while a load is on the engine because the reaction torque from the speed change unit is not transmitted to the engine in the idle state. As a result, the load on the engine is not increased with the change in the circumstantial conditions of the neutral control. As a result, the fuel consumption is improved and vibration of the engine is prevented to the extent that it does not transmit to the driver's seat.

Further, the hill-hold control is started with a proper timing in accordance with the type of vehicle and the type of automatic transmission because of the learning control for the timing for the hill-hold output.

BRIEF DESCRIPTION OF THE DRAWINGS

The invention will now be described in conjunction with the following drawings in which like features are designated with like reference characters, and wherein:

FIG. 3 is a diagram tabulating the operations of the automatic transmission in the first embodiment of the invention;

DETAILED DESCRIPTION OF THE INVENTION

The invention will become more apparent from the following detailed description of preferred embodiments, with reference to the accompanying drawings.

Figure 1:
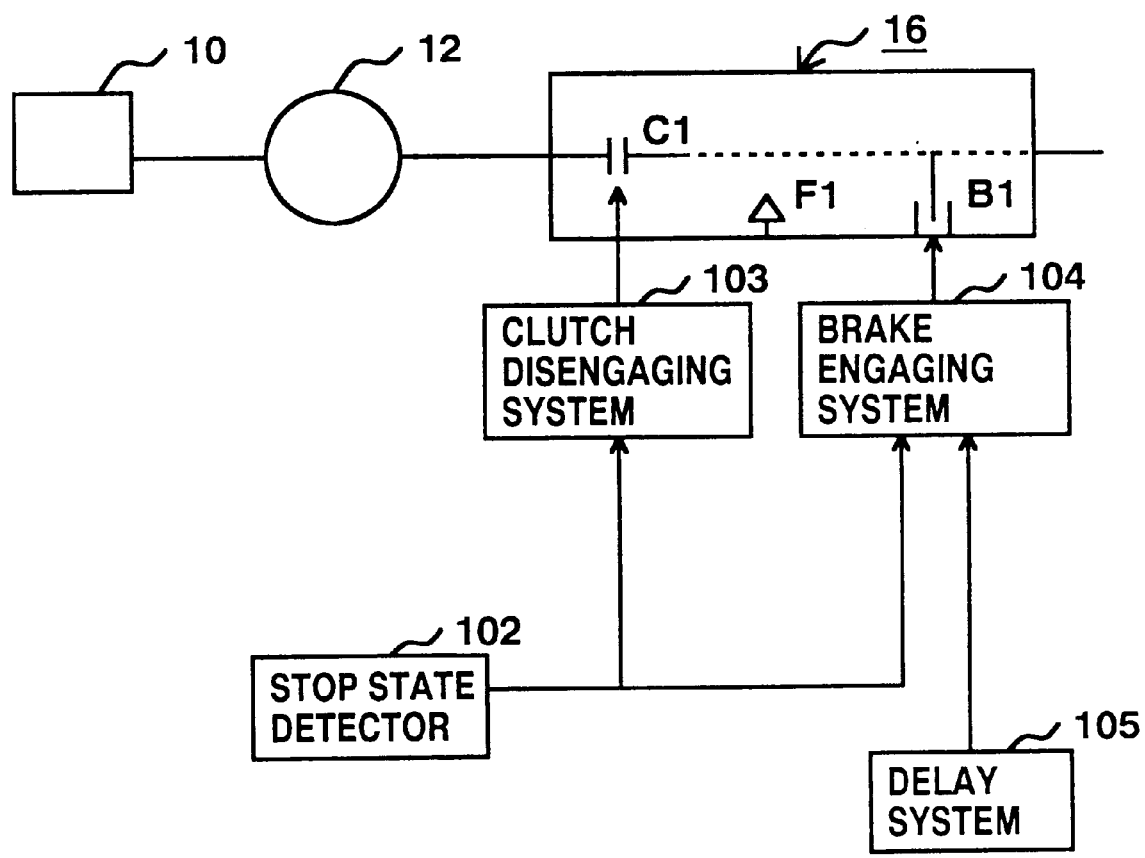
FIG. 1 is a functional block diagram of a control system for an automatic transmission according to a first embodiment of the invention.

FIG. 1 shows an engine 10, a torque converter 12 (hydraulic transmission) connected to the engine 10, a speed change unit 16, a first clutch C1 engaged when a forward driving range is selected, and a first brake B1 which is engaged to prevent the vehicle from moving backward and which establishes a hill-hold state in the transmission 16.

FIG. 1 further shows a stopped state detector 102 which detects a "vehicle stopped state" as existing when (1) the forward driving range is selected, (2) a not-shown accelerator pedal is released and (3) a not-shown brake pedal is depressed, a clutch disengaging system 103 which brings the first clutch C1 to an almost disengaged stated in performing neutral control when the vehicle stopped state is detected, a brake engaging system 104 which engages the first brake B1 for hill-hold control when the first clutch C1 is almost disengaged, and a delay system 105 which delays the timing of the speed change output for establishing second speed as a hill-hold output until a predetermined time from start of neutral control has elapsed.

Figure 2:
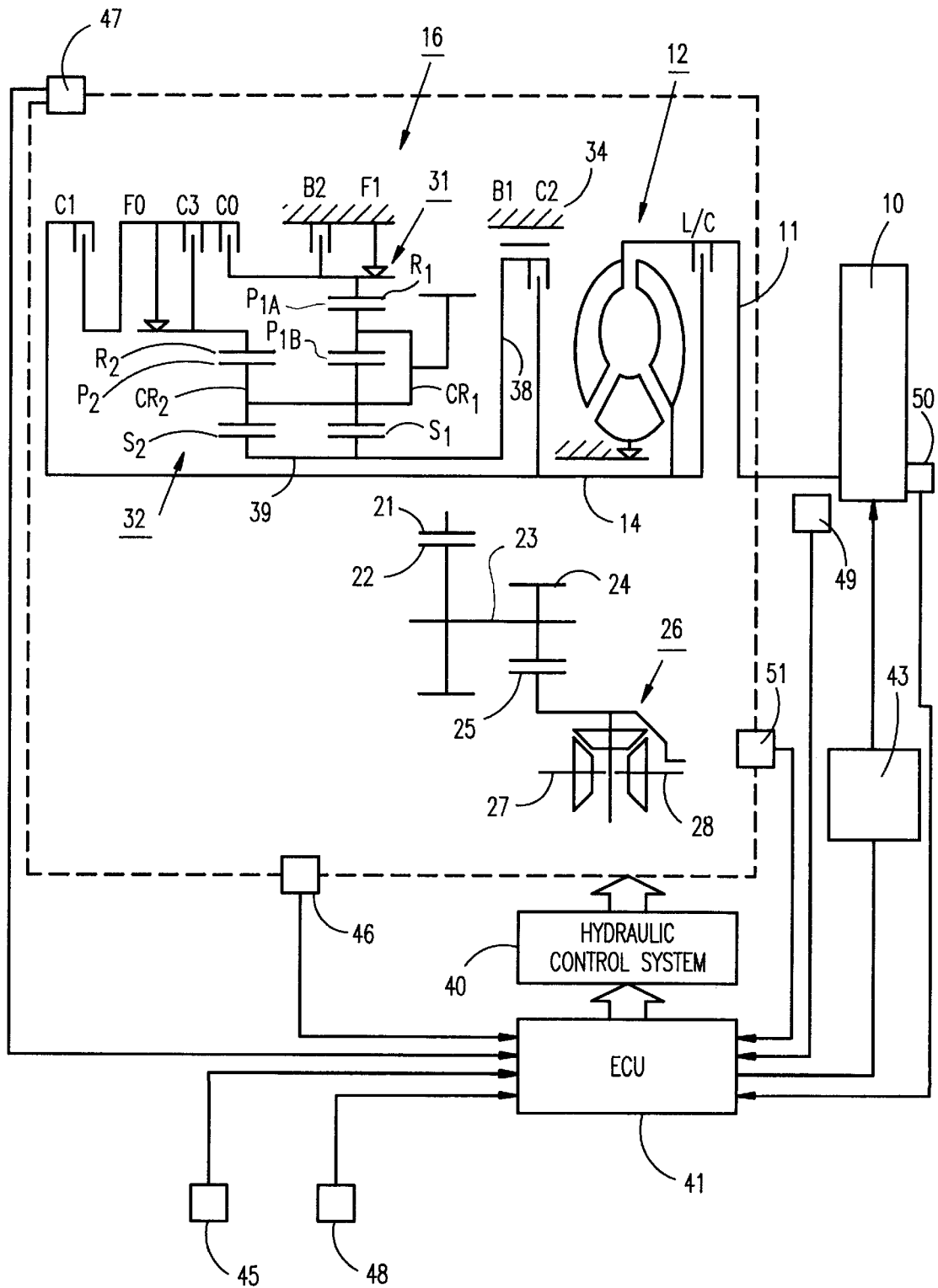
FIG. 2 is a schematic diagram of the control system and automatic transmission of the first embodiment of the invention.

As shown in FIG. 2, the rotation generated by the engine 10 is transmitted through an output shaft 11 to the torque converter 12. This torque converter 12 transmits the rotation of the engine 10 through a fluid (e.g., working oil) to an output shaft 14. However, when the vehicle speed exceeds a predetermined value, a lock up clutch L/C is applied so that the rotation is transmitted directly to the output shaft 14. The output shaft 14 serves as an input shaft for the speed change unit 16.

The output shaft 14 is connected to the speed change unit 16 for establishing four forward and one reverse gear stages. The rotation of the speed change unit 16 is transmitted through a counter drive gear 21 and a counter driven gear 22 to a counter shaft 23. The rotation of the counter shaft 23 is transmitted through an output gear 24 and a ring gear 25 to a differential unit 26.

In the differential unit 26, the rotation transmitted through the output gear 24 and the ring gear 25 is divided for transmission through left and right drive shafts 27 and 28 to the drive wheels.

The speed change unit 16 comprises a first planetary gear unit 31 and a second planetary gear unit 32, and further comprises a first clutch C1, a second clutch C2, a third clutch C3, a fourth clutch C0, a first brake B1, a second brake B2, and one-way clutches F1 and F0 for transmitting the torque between the individual elements of the first planetary gear unit 31 and the second planetary gear unit 32.

The first planetary gear unit 31 comprises a ring gear $R_1$ connected to the output shaft 14 through the first clutch C1 and the fourth clutch C0 which are arranged in series and connected to a drive unit case 34 through the second brake B2 and the one-way clutch F2 which are arranged in parallel with each other, a sun gear $S_1$ formed on a sun gear shaft 39 fitted on and rotatably supported by the output shaft 14, a carrier $CR_1$ connected to the counter drive gear 21, and pinions $P_{1A}$ and $P_{1B}$ meshed between the ring gear $R_1$ and the sun gear $S_1$ and rotatably supported by the carrier $CR_1$.

A drum 38 is fixed on the sun gear shaft 39. The drum 38 is connected through the second clutch C2 to the output shaft 14, and connected through the first brake B1 to the drive unit case 34.

The second planetary gear unit 32 comprises a ring gear $R_2$ connected to the first clutch C1 through the third clutch C3 and the one-way clutch F0, which are arranged in parallel with each other and connected to the output shaft 14 through the first clutch C1, a sun gear $S_2$ formed on the sun gear shaft 39, a carrier $CR_2$ connected to the carrier $CR_1$, and a pinion $P_2$ meshed between the ring gear $R_2$ and the sun gear $S_2$ and rotatably supported by the carrier $CR_2$.

The operations of the automatic transmission will now be described with reference to FIG. 3 wherein P designates a parking range, R designates the reverse driving range, N designates a neutral range, D designates a forward driving range, 1ST designates a first speed gear stage, 2ND designates a second speed gear stage, N* designates a neutral control state, 3RD designates a third speed gear stage, and 4TH designates a fourth speed gear stage. Moreover, the symbol ○ indicates that a first solenoid signal $SL_1$, a second solenoid signal $SL_2$ and a third solenoid signal $SL_3$ for opening/closing the first solenoid valve S1, the second solenoid valve S2 and third solenoid valve S3 are respectively ON, that the first clutch C1, the second clutch C2, the third clutch C3, the fourth clutch C0, the first brake B1, and the second brake B2 are respectively engaged, and that the one-way clutches F1 and F0 are locked. On the other hand, a symbol X indicates that the first solenoid signal $SL_1$, the second solenoid signal $SL_2$ and the third solenoid signal $SL_3$ are respectively OFF, that the first clutch C1, the second clutch C2, the third clutch C3, the fourth clutch C0, the first brake B1, and the second brake B2 are respectively disengaged, and that the one-way clutches F1 and F0 are free.

The symbol ⊚ indicates a state wherein the first brake B1 is disengaged by a predetermined release pressure. The symbol Δ indicates ON or OFF during the neutral control. The symbol (○) indicates the engine brake is engaged.

As shown in FIG. 3, at the first speed, the first clutch C1 and the third clutch C3 are engaged and the one-way clutches F1 and F0 are locked. Then, the rotation of the output shaft 14 is transmitted through the first clutch C1 and the one-way clutch F0 to the ring gear $R_2$. In this state, the rotation of the ring gear $R_1$ is stopped by the one-way clutch F1 so that the rotation of the carrier $CR_2$ is drastically decelerated while idly rotating the sun gear $S_2$. Then, the decelerated rotation is transmitted to the counter drive gear 21.

At the second speed, the first clutch C1, the third clutch C3 and the first brake B1 are engaged and the one-way clutch F0 is locked. Then, the rotation of the output shaft 14 is transmitted through the first clutch C1 and the one-way clutch F0 to the ring gear $R_2$. In this state, the rotation of the sun gear $S_2$ is stopped by the first brake B1 so that the rotation of the ring gear $R_2$ is decelerated and transmitted to the carrier $CR_2$. Then, the rotation of the carrier $CR_2$ is transmitted to the counter drive gear 21 while idly rotating the ring gear $R_1$.

At the third speed, the first clutch C1, the third clutch C3 and the fourth clutch C0 are engaged, the one-way clutch F0 is locked, and the first brake B1 is disengaged. Then, the rotation of the output shaft 14 is transmitted through the one-way clutch C0 and the third clutch C3 to the ring gear $R_2$, and transmitted through the fourth clutch C0 to the ring gear $R_1$. In this state, the first and second planetary gear units 31 and 32 are in a direct-coupled state. Therefore, the rotation of the output shaft 14 is transmitted to the counter drive gear 21 as is.

At the fourth speed, the first clutch C1, the fourth clutch C0 and the first brake B1 are engaged. Then, the rotation of the output shaft 14 is transmitted through the fourth clutch C0 to the ring gear $R_1$. In this state, the rotation of the sun gear $S_1$ is stopped by the first brake B1 so that the rotation of the ring gear $R_1$ rotates the carrier $CR_1$ at high speed while idly rotating the ring gear $R_2$. Then, the rotation of the carrier $CR_1$ is transmitted to the counter drive gear 21.

The automatic transmission is provided with a hydraulic control unit 40 for establishing the individual gear stages by engaging/disengaging the first clutch C1, the second clutch C2, the third clutch C3, the fourth clutch C0, the first brake B1, and the second brake B2.

The engine 10 is provided with an engine control unit 43 for controlling the engine 10.

The hydraulic control unit 40 and the engine control unit 43 are connected with an automatic transmission control unit (ECU) 41 so that they are operated according to the control program of the automatic transmission control unit 41.

A neutral start switch 45, an oil temperature sensor 46, a rotation speed sensor 47, a brake switch 48, an engine rotation speed sensor 49, a throttle opening sensor 50 and a vehicle speed sensor 51 are individually connected to the automatic transmission control unit 41.

The shift position of the shift lever (not shown), namely a selected range, is detected by the neutral start switch 45. The oil temperature in the hydraulic control unit 40 is detected by the oil temperature sensor 46. The rotational speed of the input side of the first clutch C1 is detected by the rotational speed sensor 47 as $NC_1$.

Furthermore, depression of the brake pedal is detected by the brake switch 48. The engine rotational speed $N_E$ is detected by the engine rotational speed sensor 49. Throttle opening is detected by the throttle opening sensor 50. Vehicle speed is detected by the vehicle speed sensor 51.

Figure 4:
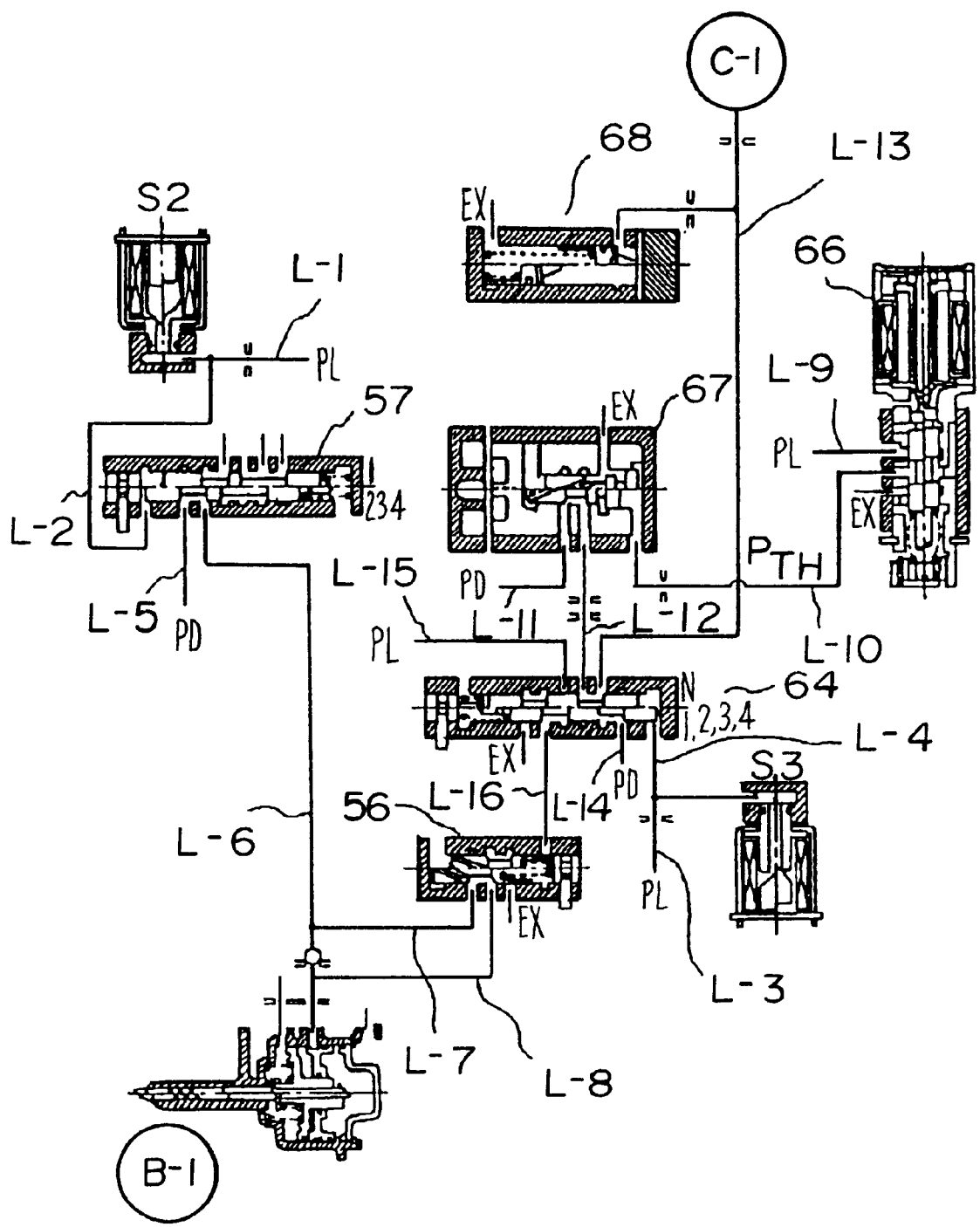
FIG. 4 is a diagram showing a hydraulic circuit for the first embodiment of the invention.

The hydraulic control unit 40 will now be described with reference to FIG. 4. In FIG. 4, a second solenoid valve S2, which is open in first speed and closed in second speed, is connected through an oil path L-1 to a primary valve (not shown) and through an oil path L-2 to a 1-2 shift valve. The second solenoid valve S2 receives a line pressure $P_L$ generated by the primary valve, and generates a signal pressure. The signal pressure is applied through the oil path L-2 to the 1-2 shift valve 57. A third solenoid valve S3, which is closed in neutral control, is connected through an oil path L-3 to the primary valve. The third solenoid valve S3 receives the line pressure $P_L$ generated by the primary valve, and generates a signal pressure. The signal pressure is applied through the oil path L-4 to a neutral relay valve 64.

The second solenoid signal $SL_2$ and the third solenoid signal $SL_3$ for opening/closing the second solenoid valve S2 and the third solenoid valve S3 are turned ON/OFF in response to change-over signals from an automatic transmission control unit 41 (FIG. 2).

The 1-2 shift valve 57 receives the signal pressure from the second solenoid valve S2 so that the 1-2 shift valve 57 takes the position represented by its upper half in first speed and takes the position of its lower half in second through fourth speeds. The 1-2 shift valve 57, in the lower half position, receives a D range pressure $P_D$ from a manual valve (not shown) through an oil path L-5, and applies the D range pressure $P_D$ through an oil path L-6 to a hydraulic servo B-1.

A B-1 modulator valve 56, in hill-hold control, receives the D range pressure $P_D$ through oil paths L-6 and L-7 from the 1-2 shift valve 57, reduces the D range pressure $P_D$ and applies the reduced pressure through an oil path L-8 to the hydraulic servo B-1. As a result, the first brake B1 is engaged, and a hill-holding force, which is equivalent to a creep force, is generated in the vehicle on, for example, an up hill grade.

A linear solenoid valve 66 is connected through an oil path L-9 to the primary valve and through an oil path L-10 to a C-1 control valve 67, respectively. The linear solenoid valve 66 is controlled by the control signal from the automatic transmission control unit 41. The linear solenoid valve 66 generates a throttle pressure $P_{Th}$ based on the line pressure $P_L$ from the primary valve, and applies the throttle pressure $P_{Th}$ as a signal pressure to the C-1 control valve 67. The C-1 control valve 67 receives the D range pressure $P_D$ through an oil path L-11, and modulates the D range pressure to a C-1 pressure $P_{C1}$ according to the throttle pressure $P_{Th}$. Then, the C-1 pressure $P_{C1}$ is applied through an oil path L-12 to the neutral relay valve 64.

The neutral relay valve 64 takes the position represented by its upper half in neutral control, and applies the C-1 pressure $P_{C1}$ generated in the oil path L-12 through an oil path L-13 to a hydraulic servo C-1.

The neutral relay valve 64 takes the position represented by its lower half in the first through fourth speeds, receives the D range pressure $P_D$ through an oil path L-14, and applies the D range pressure $P_D$ to the hydraulic servo C-1. On the other hand, the neutral relay valve 64 receives the line pressure $P_L$ through an oil path L-15 and applies the line pressure $P_L$ through an oil path L-16 to a B-1 modulator valve 56. As a result, the B-1 modulator valve 56 reduces the D range pressure $P_D$.

A damper valve 68 is provided in the oil path L-13 to prevent the C-1 pressure applied to the hydraulic servo C-1 from pulsating and functions as an accumulator.

Figure 5:
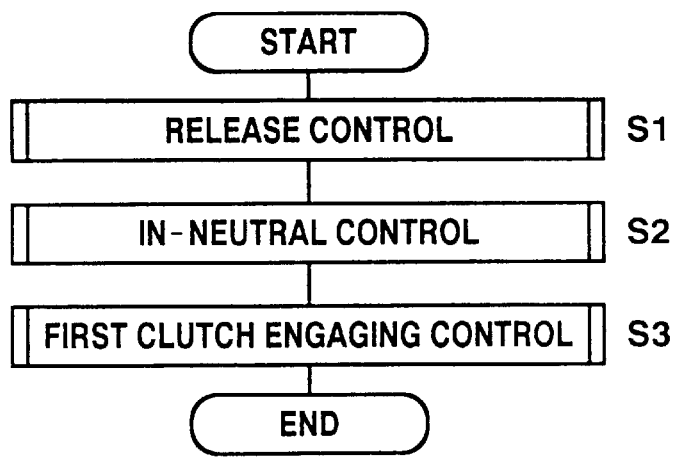
FIG. 5 is a flow chart of a neutral control routine executed in the first embodiment of the invention.

Operation of the control system described above will now be described with reference to FIG. 5 which is a flow chart of the neutral control routine in the first embodiment of the invention.

In step S1, a release control subroutine is performed. In this subroutine, a zero vehicle speed is estimated, the C-1 pressure $P_{C1}$ is swept-down with a predetermined timing to provide the neutral control, and a speed change signal for the second speed is output with a predetermined timing so that the first brake B1 (FIG. 2) is engaged for hill-holding control.

A clutch disengaging system 103 (FIG. 1) of the automatic transmission control unit 41 obtains the engine rotational speed $N_E$ according to the input torque of the speed change unit 16, outputs the C-1 pressure $P_{C1}$ according to the engine rotational speed $N_E$, and then gradually reduces the C-1 pressure $P_{C1}$.

In step 2, the clutch disengaging system 103 performs an in-neutral control subroutine so that a neutral control state is established. In this subroutine, the clutch disengaging system 103 awaits that the engine rotational speed $N_E$ and the clutch input side rotational speed $N_{C1}$ to stabilize. After the engine rotational speed $N_E$ and the clutch input side rotational speed $N_{C1}$ have steadied, the clutch disengaging system 103 modulates the C-1 pressure $P_{C1}$ to raise or lower it corresponding to the engine rotational speed $N_E$ and the clutch input side rotational speed $N_{C1}$. As a result, fuel consumption is reduced because of reduction of load from the first clutch C1 to the engine 10, and vibration of the engine 10 is reduced to the extent that it cannot be felt in the driver's seat.

In step 3, the clutch disengaging system 103 performs a first clutch engaging control subroutine. In this subroutine, the C-1 pressure $P_{C1}$ is increased gradually by a predetermined pressure increment set based on, for example, the throttle opening θ and the engine rotational speed $N_E$, and the piston stroke of hydraulic servo C-1 is ended. Then, the C-1 pressure $P_{C1}$ is increased by a predetermined pressure increment after the piston stroke of the hydraulic servo C-1 has been completed so that engagement shock is prevented.

Figure 6:
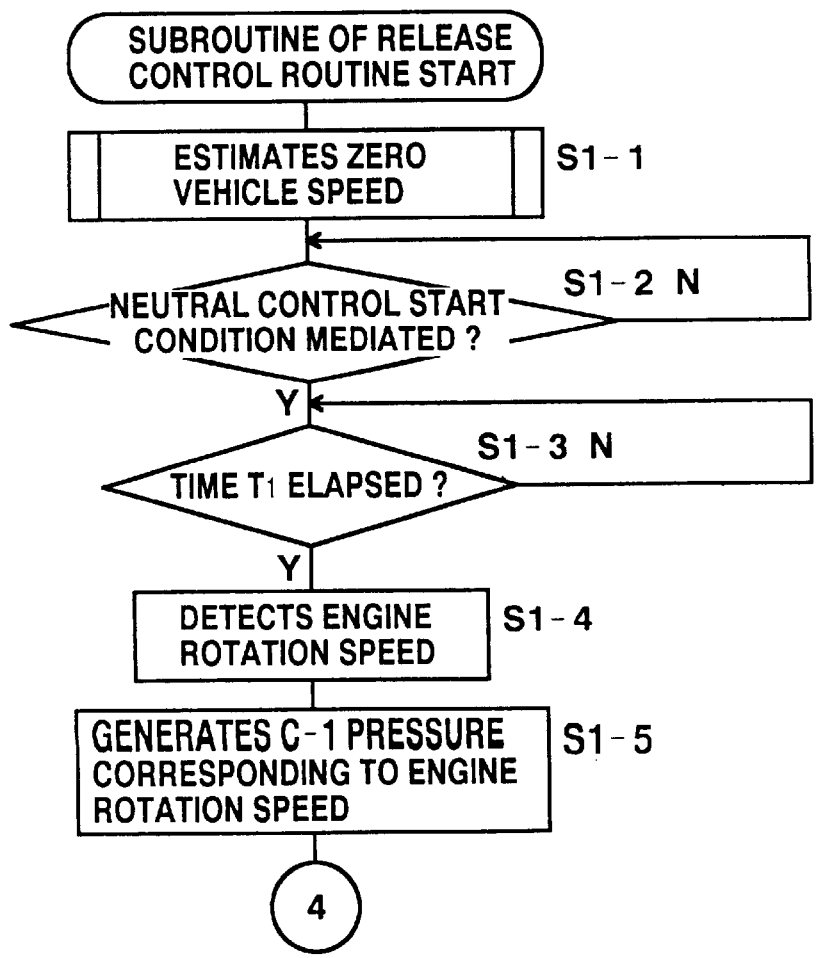
FIG. 6 is a first portion of flow chart of a subroutine for release control in the first embodiment of the invention.
Figure 7:
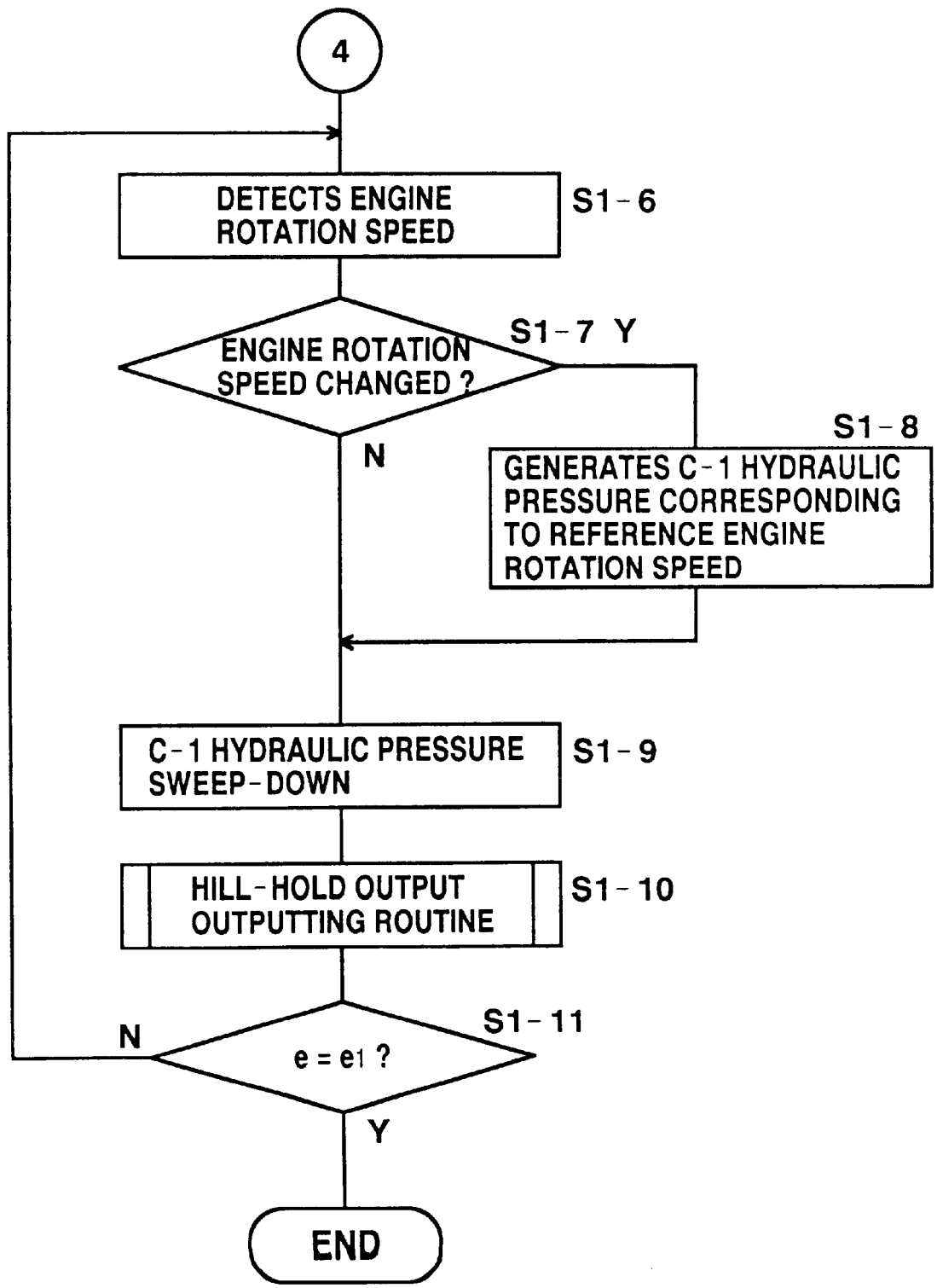
FIG. 7 is a continuation of the flow chart of FIG. 6.

A subroutine for release control (step S1 in FIG. 5) will now be described with reference to FIGS. 6, 7 and 8.

Figure 8:
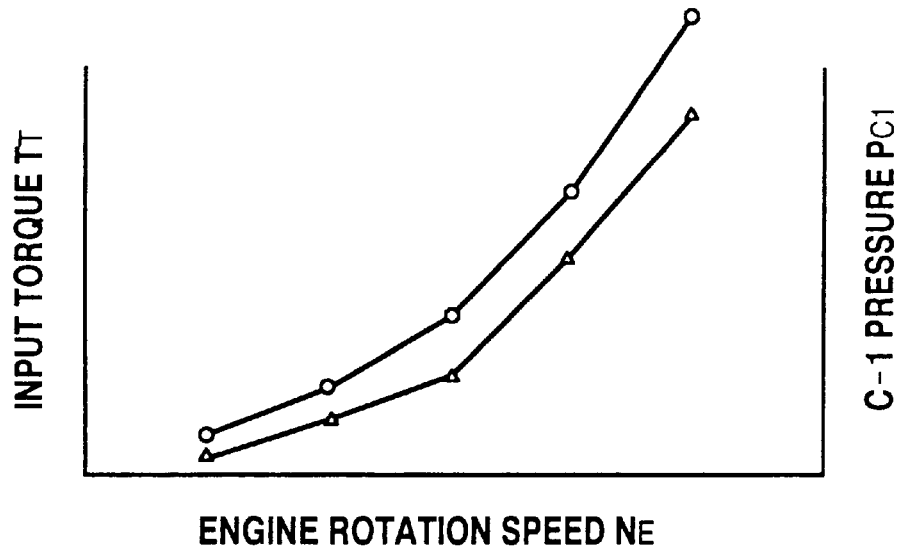
FIG. 8 is a graph of the relationships between engine rotational speed, input torque and C-1 hydraulic pressure in the first embodiment of the invention.

In FIG. 8, the horizontal axis indicates the engine rotational speed $N_E$, and the ordinate indicates the input torque $T_T(=t \cdot C \cdot N_E{}^2)$ and C-1 pressure $P_{C1}$.

In step S1-1, the zero vehicle speed estimation subroutine is performed based on the amount of change of the clutch input side rotational speed $N_{C1}$.

In step S1-2, the stopped state detector awaits satisfaction of the condition for starting the neutral control. At the same time, a first timer (not shown) is started. It is determined that the starting condition is satisfied, when all the following conditions are satisfied: the clutch input side rotational speed $N_{C1}$ is substantially 0; the accelerator pedal is released so that the throttle opening θ is no more than a predetermined value; the oil temperature detected by the oil temperature sensor 46 (FIG. 2) is higher than a predetermined value; and the not-shown brake pedal is depressed so that the brake switch 48 is ON. Whether the clutch input side rotational speed $N_{C1}$ is substantially 0 is determined as the detection limit of the rotational speed sensor 47. In this embodiment, it is determined that the detection limit is reached when the actual vehicle speed falls to a set value (2 Km/h).

In step S1-3, the stop state detector awaits the lapse of a time T1 as timed by the first timer. The time T1, in turn, is calculated by the zero vehicle speed estimation routine in step S1-1, and it is estimated that the vehicle speed has been reduced to zero when the time T1 has elapsed. In this way, the stop state detector 102 (FIG. 1) detects existence of the vehicle stopped state. Then, the neutral relay valve 64 (FIG. 4) is in the position indicated by its upper half so that it is possible to control the C-1 pressure $P_{C1}$, and a second timer (not shown) is started.

In step S1-4, the engine rotational speed $N_E$ corresponding to the input torque $T_T$ is detected, as illustrated in FIG. 8, and the value of the engine rotational speed $N_E$ is set as the reference engine rotational speed $N_{EM}$. At step S1-5, in a manner to correspond to the engine rotational speed $N_E$, the C-1 pressure $P_{C1}$ immediately before the start of release of the first clutch C1 is established and output.

In step S1-6, the engine rotational speed $N_E$ corresponding to the input torque $T_T$ is detected again.

In step S1-7, the engine rotational speed $N_E$ is compared with the reference engine rotational speed $N_{Em}$ to determine whether it has changed. The routine advances to Step S1-8, when the engine rotational speed $N_E$ has changed with reference to the reference engine rotational speed $N_{Em}$, but to Step S1-9 when it has not changed.

In step S1-8, the value of the engine rotational speed $N_E$, when it is determined in Step S1-7 that the engine rotational speed $N_E$ has changed with reference to the reference engine rotational speed $N_{Em}$ is set as the reference engine rotation speed $N_{Em}$, and the C-1 pressure $P_{C1}$ corresponding to the updated reference engine rotational speed $N_{Em}$ is established and output.

In step S1-9, the C-1 pressure $P_{C1}$ is decreased by a predetermined pressure increment after each lapse of a predetermined period of time.

In step S1-10, the brake engaging system 104 of the automatic transmission control unit 41 performs the hill-holding subroutine so that the hill-holding control is started. In the hill-holding subroutine, the speed change output for the second speed is output at a predetermined time so that the second solenoid signal $SL_2$ for opening/closing the second solenoid valve S2 is turned ON. As a result, the hydraulic servo B-1 is supplied with a hydraulic pressure to engage the first brake B1.

Thus, the hill-holding control is started, the second speed gear stage is established in the speed change unit 16, the first clutch C1, the third clutch C3 and the first brake B1 are engaged, and the one-way clutch F1 is locked. In this state, if the vehicle is started on, for example, an incline, a rotational force in an opposite direction is transmitted to the counter shaft 23 tending to rotate the ring gear $R_1$ in a positive direction. But the one-way clutch F1 prevents the ring gear $R_1$ from rotating so that the vehicle does not move backward.

In step S1-11, it is determined whether the speed ratio $e(=N_{C1}/N_E)$ is equal to a predetermined value $e_1$. The subroutine is ended when the speed ratio e is equal to the predetermined value $e_1$, but returns to Step S1-6 when the speed ratio e is not equal to the predetermined value $e_1$. This predetermined value $e_1$ is set to 0.75, for example, in consideration of the delay in the change of the clutch input side rotational speed $N_{C1}$ brought about by the action of the hydraulic pressure at the instant when the first clutch C1 is released. Here, the speed ratio e may be replaced by the clutch input side rotational speed $N_{C1}$.

Even when the first clutch C1 is detected to be engaged by determining whether the rotational difference ΔN (the difference between the engine rotational speed as the input side rotational speed of the torque converter 12 and the clutch input side rotational speed $N_{C1}$ as the output side rotational speed of the same) has changed, the rotational difference ΔN will not change either where the first clutch C1 is completely engaged or where the same is released. It is, therefore, difficult to distinguish between the state where the first clutch C1 is completely engaged and the state where the same is released.

By waiting for the speed ratio e to become equal to the predetermined value $e_1$ therefore, it is possible to reliably establish the state immediately before the engagement of the first clutch C1 is started, i.e. the state wherein the C1 clutch is almost disengaged.

Figure 9:
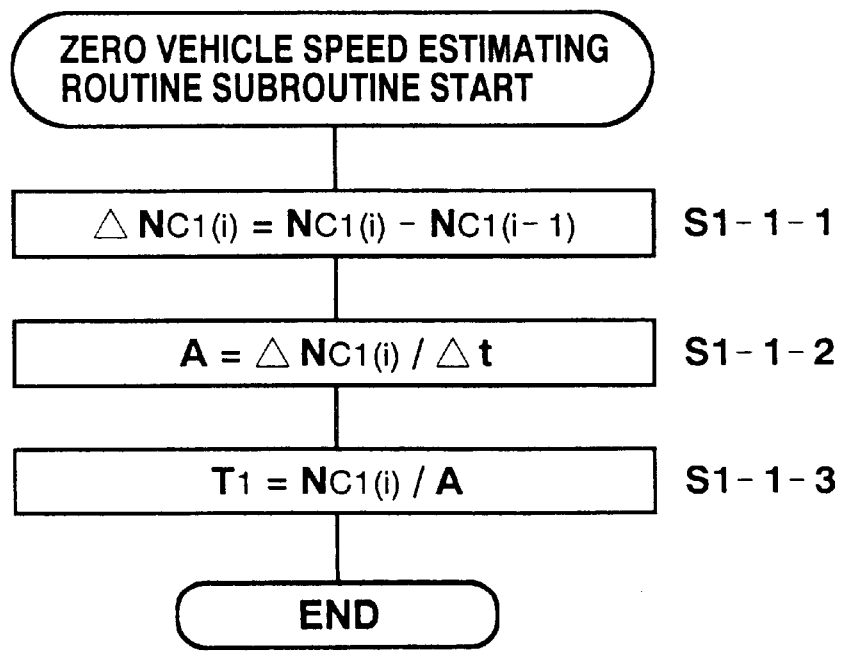
FIG. 9 is a flow chart of a subroutine for a zero vehicle speed estimation in the first embodiment of the invention.

The zero vehicle speed estimating subroutine (Step S1-1 of FIG. 6) will now be described in connection with FIG. 9 which is a flow chart of the zero vehicle speed estimating subroutine in the first embodiment of the invention.

In step S1-1-1, the rotational speed difference $\Delta N_{C1(I)}$ is calculated by subtracting the clutch input side rotational speed $N_{C1(i-1)}$ at time $\Delta t$ from the present clutch input side rotational speed $N_{C1(I)}$. In this subroutine, the time $\Delta t$ is set by the clock in the automatic transmission control unit 41 (FIG. 2) so that the clutch input side rotational speed $N_{C1}$ is detected at every increment of time $\Delta t$.

In step S1-1-2, a deceleration value A for the vehicle is calculated by dividing the rotational speed difference $\Delta N_{C1(I)}$, by the time $\Delta t$.

In step S1-1-3, a time $T_1$, (until the vehicle stopped state) is calculated by dividing the present clutch input side rotational speed $N_{C1(i)}$ by the deceleration A.

When the first brake is engaged an exceedingly short time after the speed change output for the second speed and the hill-holding state is established while engaging the first clutch, the automatic transmission is rotated a little bit in one direction around an input shaft by a reaction force received before establishing the hill-holding state and held in that state because the reaction force is transmitted from the speed change unit 16 to the engine 10 at idle. When the first brake is then engaged before disengaging the first clutch, the automatic transmission is maintained in a state receiving the reaction force. Then the engine 10 connected to the automatic transmission is held in the same state.

As a result, the neutral control is performed with the engine under load.

In this case, a load on the engine 10 increases with change in the conditions of the neutral control. As a result, the fuel consumption is not improved and vibration of the engine 10 is not reduced enough to avoid transmitting same to the driver's seat.

In the foregoing embodiment of the invention, when a predetermined hill-holding time $\tau 1$ has elapsed after the vehicle has assumed the vehicle stopped state, the speed change output for the second speed is output and the second solenoid signal $SL_2$ is turned ON.

The subroutine of the hill-holding output subroutine (step S1-10 of FIG. 7) will now be described with reference to FIG. 10 which is a flow chart of the subroutine of the hill-holding output routine in the first embodiment of the invention and FIG. 11 which is a time chart for the hill-holding output routine in the first embodiment of the invention.

Figure 11:
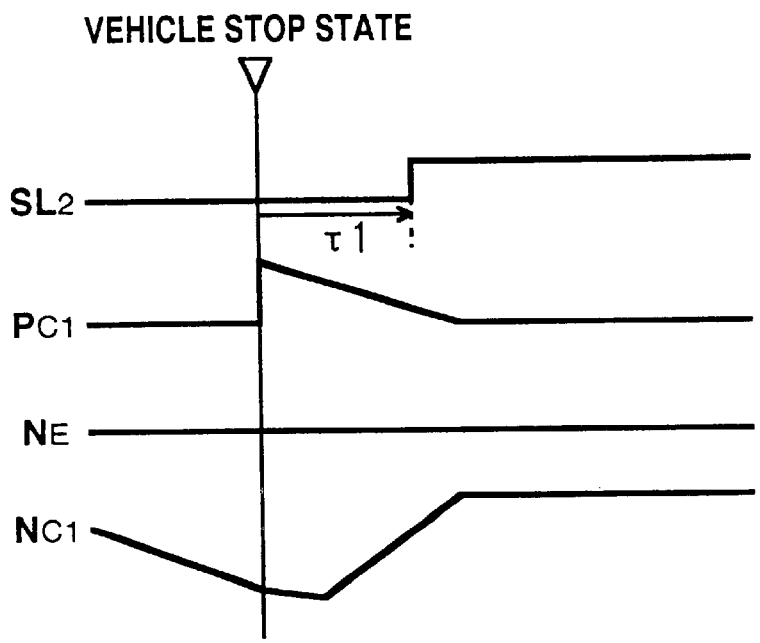
FIG. 11 is a time chart of the hill-hold output generation subroutine of FIG. 10.

In this subroutine, as shown in FIG. 11, when the vehicle is in the vehicle stopped state, the sweep-down of the C-1 pressure $P_{C1}$ is started and the second timer is started. Then, when the hill-holding time $\tau 1$ has elapsed, the delay system 105 (FIG. 1) of the automatic transmission control unit 41 (FIG. 2) outputs the speed change output for the second speed so that the second solenoid signal $SL_2$ is turned ON.

Thus, because the time for the speed change output for the second speed is delayed, it is impossible to establish the hill-holding state in the speed change unit 16 while engaging the first clutch C1, even when the first brake B1 is engaged in an exceedingly short time after the speed change output for the second speed. That is, when the speed change unit 16 is in the hill-holding state, the engine 10 is in the same state as when the neutral range is selected. Therefore, the neutral control is prevented while the engine 10 is under load because the reaction torque from the speed change unit 16 is not transmitted to the engine 10 at idle. As a result, the load on the engine is not increased with the change in the conditions of the neutral control. As a result, the fuel consumption is improved and vibration of the engine is prevented enough so as not to be transmitted to the driver's seat.

If the time when the hill-holding time $\tau 1$ has elapsed is designated $t_A$, the speed ratio is a predetermined value $e_1$, the timing for almost disengaging the first clutch C1 is $t_B$, and an infinitesimal time is designated $\delta$, the time $t_A$ is set so that it is within the range:

$$t_B - \delta < t_A < t_B + \delta$$

Here, the infinitesimal time is set so that the vehicle does not roll backward after almost disengaging the first clutch C1 when the timing for outputting the speed change output for the second speed is further delayed.

Figure 10:
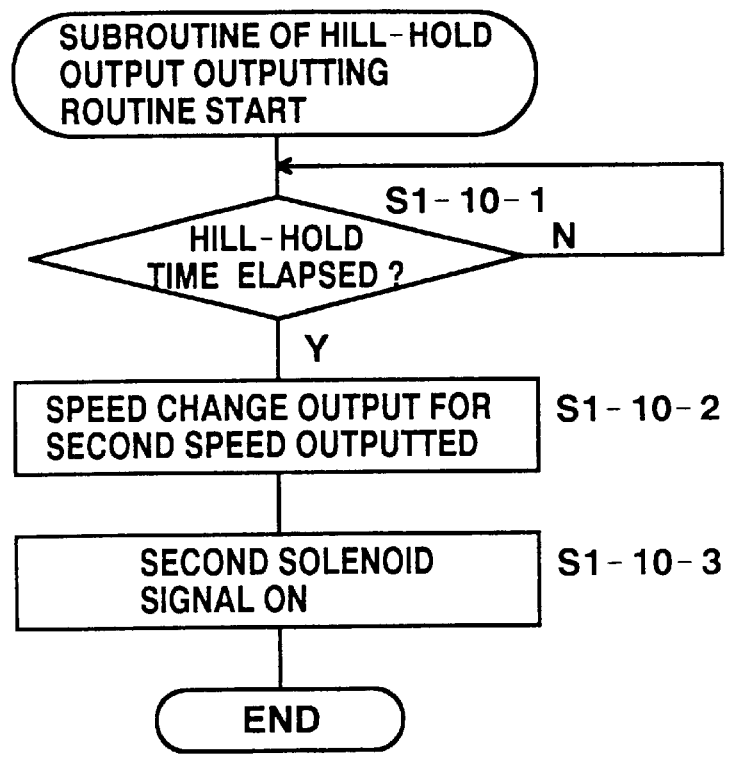
FIG. 10 is a flow chart of a subroutine for hill-hold output generation in the first embodiment of the invention.

With reference to FIG. 10, in step S1-10-1, the subroutine awaits lapse the hill-hold time $\tau 1$ as timed by the second timer. In step S1-10-2, the speed change output for the second speed is output. In step S1-10-3, the second solenoid signal $SL_2$ is turned ON.

Figure 12:
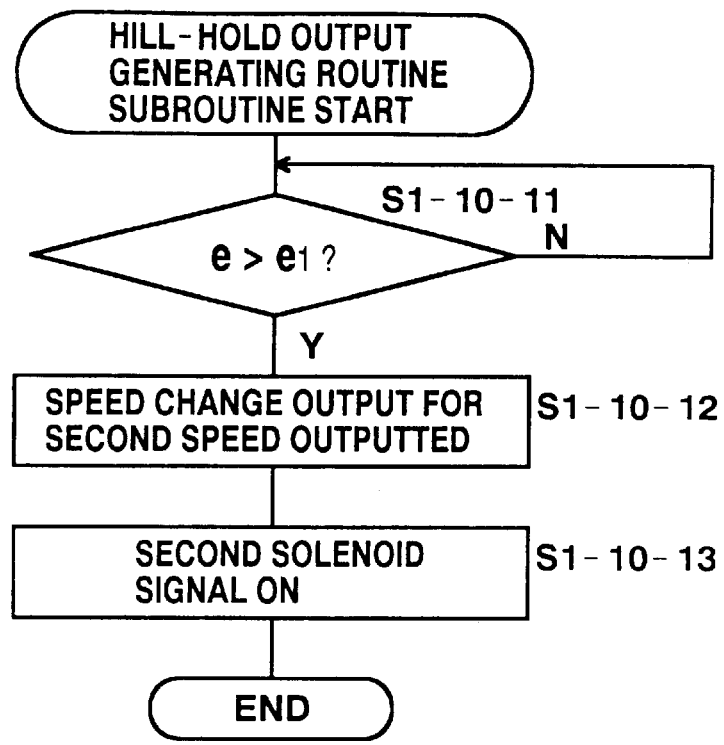
FIG. 12 is a flow chart of a subroutine for a hill-hold output generation in a second embodiment of the invention.

A second embodiment of the invention will now be described with reference to FIG. 12 which is a flow chart showing the hill-hold output subroutine. In this second embodiment, the second timer does not time. The delay system 105 (FIG. 1) delays the timing for outputting the speed change for the second speed based on a monitored change in a speed ratio e, corresponding to the state of the first clutch C1. Then, when the speed ratio e becomes equal to the predetermined value $e_1$, it is determined that the first clutch C1 is almost disengaged and the speed change for the second speed is output.

In step S1-10-11, the subroutine awaits the speed ratio e to become equal to the predetermined value $e_1$. In step S1-10-12, the speed change for the second speed is output. In step S1-10-13, the second solenoid signal $SL_2$ is turned ON.

Here, in this second embodiment, the first clutch C1 is determined to be almost disengaged based on the speed ratio e. But it is possible to replace the speed ratio e with the clutch input side rotation speed $N_{C1}$.

In the first embodiment, the hill-hold time $\tau 1$ is set to the predetermined steady value. But the proper hill-hold time $\tau 1$ is different for different vehicles and different automatic transmissions.

A third embodiment of the invention will now be described. In this third embodiment, target values are set for the operation of the engine, with regard to fuel consumption and/or the vibration transmitted to the driver's seat when the neutral range or the parking range is selected. Then, the timing for the speed change output for the second speed is adjusted by learning control so that the fuel consumption and/or the vibration become equal to the target values. Then, the hill-hold time $\tau 1$ is renewed.

Figure 13:
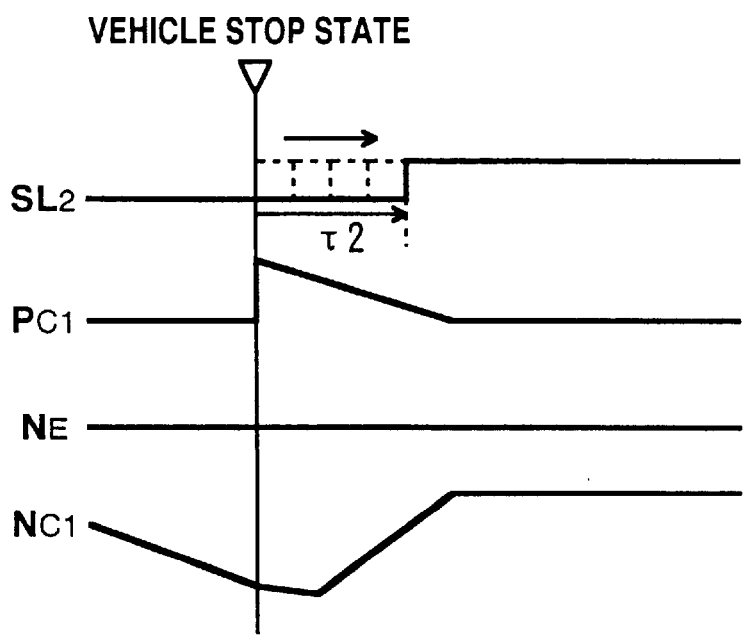
FIG. 13 is a time chart of the hill-hold output generation subroutine of FIG. 12.
Figure 14:
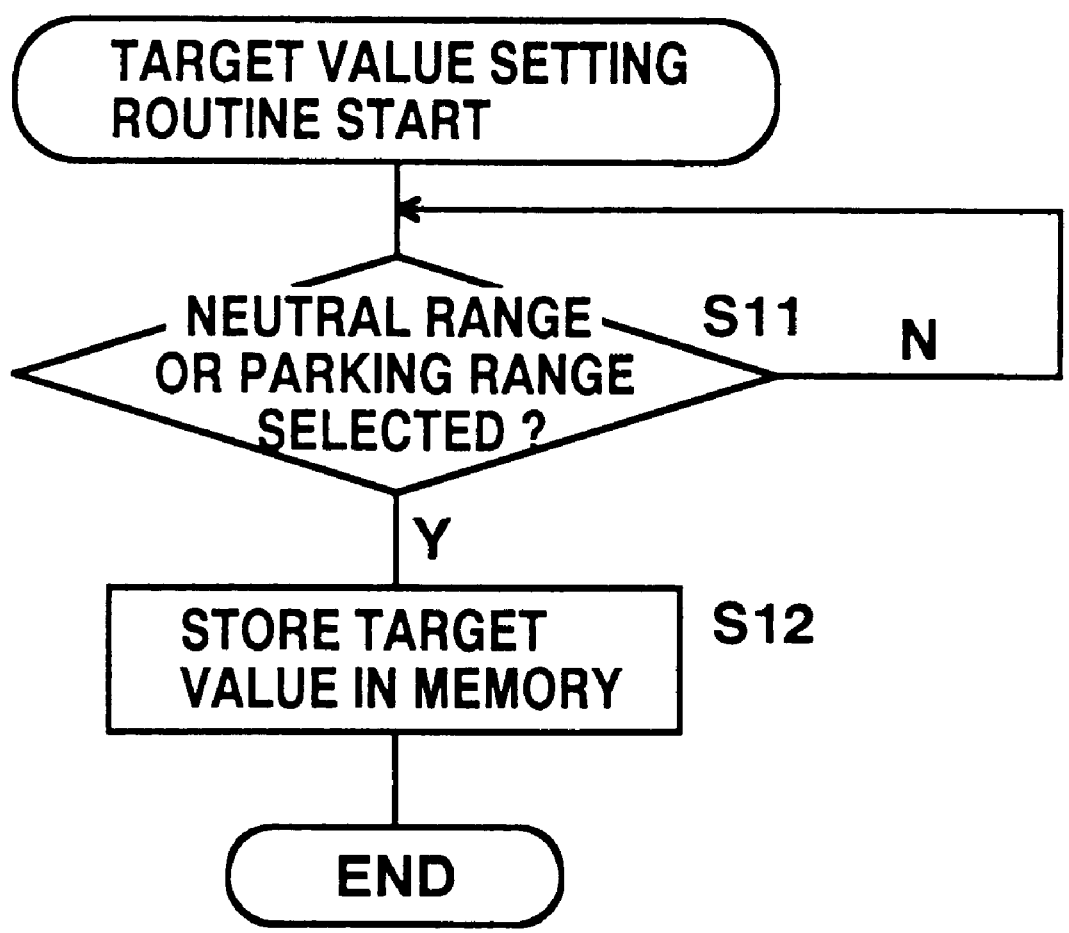
FIG. 14 is a flow chart of a target value setting routine in a third embodiment of the invention.
Figure 15:
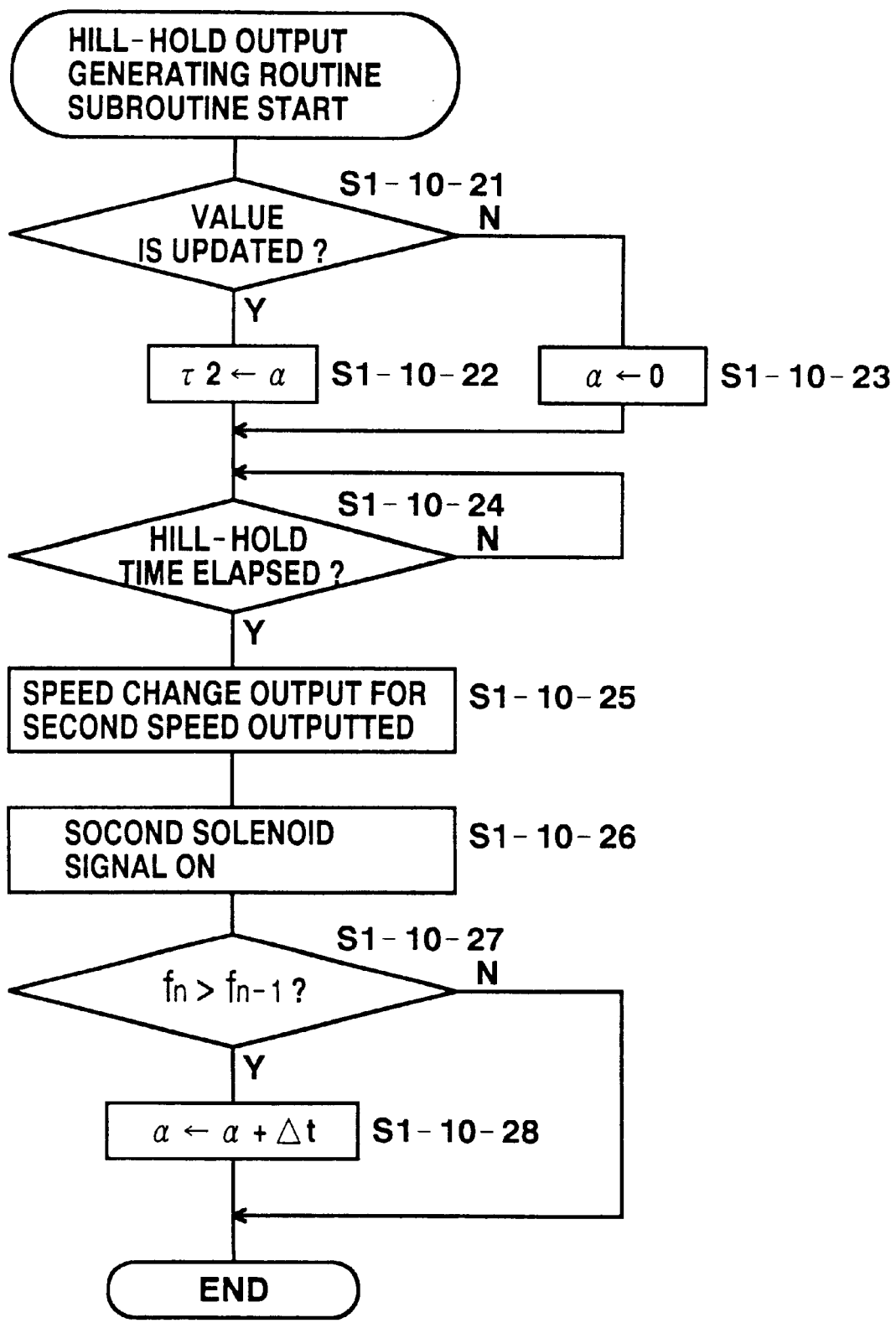
FIG. 15 is a flow chart of a subroutine for hill-hold output generation in the third embodiment of the invention.

FIG. 13 is a time chart of the hill-hold output subroutine in the third embodiment of the invention, FIG. 14 is a flow chart showing a target value setting subroutine in this third embodiment and FIG. 15 is a flow chart of the subroutine for hill-holding output in the third embodiment of the invention.

In this third embodiment, as shown in FIG. 13, when the vehicle is in the vehicle stopped state, the C-1 pressure $P_{C1}$ undergoes a sweep-down and a third timer (not shown) starts to time. Then, after a hill-hold time τ2 has elapsed, the speed change output for the second speed, as a hill-hold output, is output and the second solenoid signal SL$_2$ is turned ON.

The first value of the hill-hold time τ2 is set at 0 and the speed change output for the second speed is output when the vehicle is in the vehicle stopped state. After that, the learning for the timing of the speed change output for the second speed is performed so that the hill-hold time τ2 is reset and gradually extended. When the fuel consumption or the vibration of the engine 10 at the time the speed change output is equal to the target value, the hill-hold time τ2 is taken to be the proper value.

As shown in FIG. 14, in the target value setting subroutine, when the vehicle is stopped and the neutral range or the parking range is selected while the vehicle is travelling in the forward driving range, the fuel consumption or the vibration at that time is stored in a memory (not shown).

As shown in FIG. 15, the hill-hold output subroutine is executed and the hill-hold time τ2 is reset by the learning control.

That is, it is determined, based on the learning value α, whether the hill-hold time τ2 has elapsed. When the hill-hold time τ2 has elapsed, the speed change output for the second speed is output and the second solenoid signal SL$_2$ is turned ON.

At this time, the fuel consumption or the vibration at the time of the speed change output for the second speed is detected, and the detected value is used as an index value $f_i$ (i=i, 2, . . . , n-1, n, . . . ). Here, the fuel consumption is detected by a first operation detector (not shown) of the automatic transmission control unit 41 (FIG. 2), which reads data for the amount of fuel injection to the engine 10, and the vibration is detected by a vibroscope serving as a second operation detector (not shown).

Then, the index value $f_n$ at the current detection time and the index at the last detection time are compared with each other, and when the inequality $f_n > f_{n-1}$ is satisfied, a value Δt is added to the learning value α.

Because the learning control is performed so that the index $f_1$ becomes equal to the target value, it is possible to adjust the hill-hold time τ2 to the proper value. As a result, the fuel consumption is sufficiently improved because the load on the engine 10 is not increased, and the vibration of the engine 10 is prevented from being transmitted to the driver's seat upon change in the operative conditions during neutral control.

In this embodiment, the hill-hold time τ2 is adjusted by the learning control. But it is also possible to reset based on the predetermined value $e_1$ and the clutch input side rotation speed $N_{C1}$ as in the second embodiment.

With reference to the flow chart of FIG. 14 (target value setting subroutine), in step S11, the subroutine awaits selection of either the neutral range or the parking range. In step S12, the target value is stored in the memory.

In the subroutine for hill-holding output illustrated by the flow chart of FIG. 15, in step S1-10-21, it is determined whether the index $f_1$ is renewed. The subroutine advances to Step S1-10-22, when the index $f_1$ is changed, but to Step S1-10-23 when not changed. In step S1-10-22, the learning value α is set as the hill-holding time τ2. In step S1-10-23, 0 is set as the learning value α. In step S1-10-24, the subroutine awaits lapse the hill-holding time τ2. In step S1-10-25, the speed change output for the second speed is output. In step S1-10-26, the second solenoid signal SL$_2$ is turned ON. In step S1-10-27, it is determined whether the index $f_n$ at the current detection time is larger than the index $f_{n-1}$ at the last time of detection. The routine advances to Step S1-10-28, when the index value $f_n$ at the current detection time is larger than the index value $f_{n-1}$ at the last detection time, but the routine is ended when the index value $f_n$ at the current detection time is smaller than or equal to the index value $f_{n-1}$ at the last detection time.

In step S1-10-28, the learning value α is increased by addition of the value Δt and thus reset (renewed).

In each of the aforementioned embodiments, the hill-holding state is established in the speed change unit 16 by engaging the first brake B1 and locking the one-way clutch F1. But, in the alternative, it is possible to establish the hill-hold state in the speed change unit 16 by engaging the first brake B1 and the second brake B2.

The disclosure of Japanese H09-337462 filed Dec. 8, 1997, inclusive of its specification, claims, abstract and drawings is hereby incorporated herein by reference.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for an automatic transmission which includes a hydraulic power transmission connected to an engine, a speed change unit, a clutch which is engaged when a forward driving range is selected, and a brake which is engaged to prevent a vehicle from moving backward and to thereby establish a hill-holding state in the speed change unit, said control system comprising:

a stop state detector which determines a vehicle stopped state by detection that the forward driving range has been selected, that an accelerator pedal is released and that a brake pedal is depressed;

a clutch disengaging system which provides a neutral control wherein the clutch is almost disengaged;

a brake engaging system which initiates a hill-holding control by engaging the brake; and a delay system which delays timing of initiation of the hill-holding control until after initiation of the disengagement of the clutch by the clutch disengaging system, and which initiates said hill holding control responsive to said clutch reaching the state where it is almost disengaged.

2. The control system for an automatic transmission according to claim 1 wherein the delay system allows initiation of the hill-holding control when a predetermined hill-holding time has elapsed after the vehicle stopped state is detected.

3. The control system for an automatic transmission according to claim 1 wherein the delay system allows initiation of the hill-holding control responsive to a change in a parameter related to the state of the clutch.

4. The control system for an automatic transmission according to claim 1 further comprising an operation state detector which detects an operating parameter of the engine and a learning control system which performs learning for the timing of the hill-hold output based on the detected engine operating parameter while in a non-driving range and while under the hill-holding control.

5. The control system for an automatic transmission according to claim 2 further comprising an operation state detector which detects an operating parameter of the engine and a learning control system which performs learning for the timing of the hill-hold output based on the detected engine operating parameter while in a non-driving range and while under the hill-holding control.

6. The control system for an automatic transmission according to claim 3 further comprising an operation state detector which detects an operating parameter of the engine and a learning control system which performs learning for the timing of the hill-hold output based on the detected engine operating parameter while in a non-driving range and while under the hill-holding control.

7. The control system for an automatic transmission according to claim 2 further comprising an operation state detector which detects the operating parameter of the engine and a learning control system which performs learning for the timing of the hill-hold output based on the detected engine operating parameter while in a non-driving range and while under the hill-holding control, wherein the learning control system predetermines the hill-holding time by setting a first value for the hill-holding time and incrementally changes value by learning.

\* \* \* \* \*